United States Patent [19]

Erwin

[11] 4,119,485

[45] Oct. 10, 1978

[54] HEAT EXCHANGERS AND EVAPORATORS

[75] Inventor: Ransome W. Erwin, Ogden, Utah

[73] Assignee: Austral-Erwin Engineering Company, Houston, Tex.

[21] Appl. No.: 581,849

[22] Filed: May 29, 1975

Related U.S. Application Data

[62] Division of Ser. No. 306,183, Nov. 14, 1972, Pat. No. 3,891,496.

[51] Int. Cl.² .............................................. B01D 1/00
[52] U.S. Cl. .......................... 159/28 B; 159/DIG. 15; 159/DIG. 13; 165/142; 203/86
[58] Field of Search .......... 159/28 B, 28 R, DIG. 13, 159/DIG. 15, DIG. 33; 165/142; 203/86, 100, 7

[56] References Cited

U.S. PATENT DOCUMENTS

| | | | |
|---|---|---|---|
| 2,499,608 | 3/1950 | Rink | 165/142 |
| 2,714,139 | 7/1955 | Yula | 165/142 |
| 2,903,243 | 9/1959 | Erwin | 159/DIG. 15 |
| 3,050,786 | 8/1962 | St. John et al. | 159/28 R |
| 3,489,209 | 1/1970 | Johnson | 159/28 R |
| 3,502,141 | 3/1970 | Allen | 159/28 R |

FOREIGN PATENT DOCUMENTS 894,504  4/1962  United Kingdom ..................... 165/142

*Primary Examiner*—Norman Yodkoff

[57] ABSTRACT

Apparatus for effecting heat interchange of fluids, at least one of the fluids containing dispersed or dissolved solids, said apparatus having one or more fluids contacted surfaces which are (1) preferentially oil wettable and (2) substantially zero water adsorbent, wherein the contacted surface or surfaces comprise fluorocarbon polymers, preferably FEP hexafluoropropylenetetra fluoroethylene fluorinated hydrocarbon resin, and (3) means for supplying oil or the like to said contacted surface or surfaces, to prevent adherence of solids thereto.

7 Claims, 5 Drawing Figures

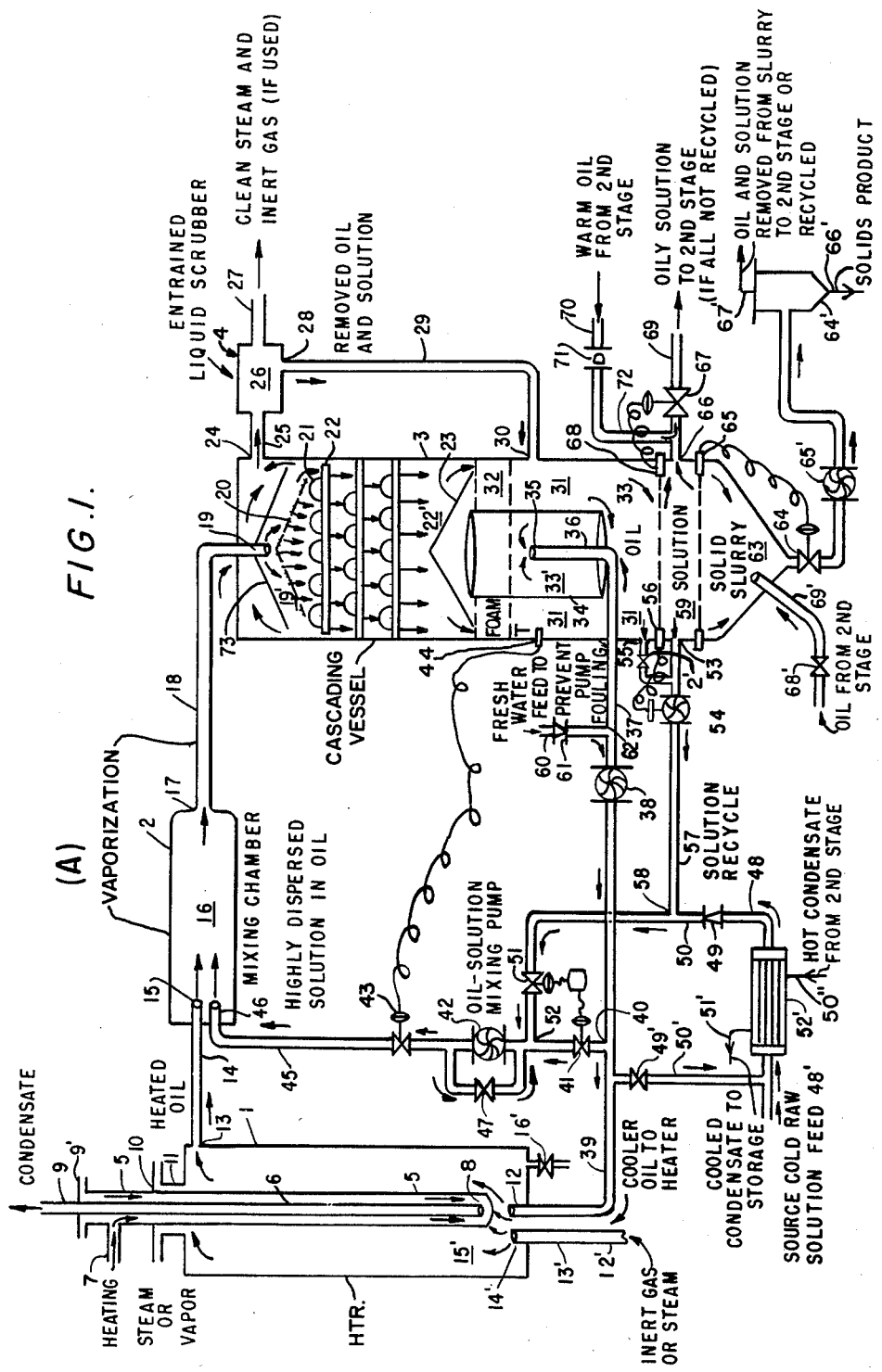

HEAT EXCHANGERS AND EVAPORATORS

This application is a division of Ser. No. 306,183, filed Nov. 14, 1972 and now U.S. Pat. No. 3,891,496.

ESSENCE OF THE INVENTION

The invention relates to an improvement in the apparatus for evaporating an aqueous solution containing dissolved solids to prevent adherence of precipitated solids to the contacted surface of the apparatus in which the method is carried out; which improvement consists in that the evaporation of the solution takes place in apparatus whose hot contacted surface is preferentially oil wettable and zero adsorbent of water from the solution while continuously wetting the contacted surface with an organic liquid which is immiscible with the aqueous solution being evaporated, said contacted surface comprising a fluorocarbon polymer.

The use of preferentially oil wettable surfaces in emulsion treaters is old as shown in my prior U.S. Pat. No. 3,903,243 discussed more fully hereinafter, but such surfaces are not substantially zero water adsorbent, a feature which I have now found to be essential to the prevention of adherence of precipitated solids to the hot contacting surface of an evaporator for aqueous solutions containing dissolved solids. More specifically, I have now found that by using a contacted surface comprising a fluorocarbon polymer, while continuously wetting the contacted surface with an organic liquid which is immiscible with the aqueous solution being evaporated adherence of precipitated solids to the contacted surface is avoided.

BACKGROUND OF THE INVENTION

Because of its enormous scope in virtually all industrial processes, any significant improvement in heat transfer from one fluid to another and evaporation of aqueous liquids cannot help but be of utmost importance to most industries. Such improvement is concerned with innumerable processes, some of which are: making good water from seawater and brackish water, salvaging the mineral content, if possible; converting industrial waste waters to potable water, salvaging the contaminants, if possible; converting radioactive atomic waste waters to solids which may be more readily isolated or stored in harmless areas than is possible with liquids; evaporating juices such as in the cane and beet sugar industry more efficiently with consumption of less energy for such; converting acidic mine waters to harmless solids, salvaging the water and valuable mineral content; converting brines, such as Great Salt Lake, into fresh water and valuable mineral contituents; and workable heat transfer systems to utilize steam power and recover valuable mineral contents from steam and brine produced by natural geothermal wells. Further developments in connection with fluids derived from geothermic wells are set forth in my application Ser. No. 588,797 filed June 20, 1975 entitled HEAT EXCHANGE METHOD AND APPARATUS, which application is a continuation-in-part of Ser. No. 306,183, now U.S. Pat. No. 3,891,496 dated June 24, 1975 and of the present application Ser. No. 581,849. In all of the aforementioned processes, the fouling of heat transfer surfaces and surfaces of confining vessels and the prevention thereof is astronomical in cost in manpower, maintenance, downtime, and low energy efficiency. This invention offers a novel, practicable means and method for prevention of such surface contamination without need of expensive and elaborate chemical treatment, together with novel means and methods for handling and separation of difficult mixtures of solids, liquids and gases.

In my U.S. Pat. No. 2,903,243, granted Sept. 8, 1959, is disclosed my discovery that precoating a heating element with a preferentially oil wettable material such as a silicone, epoxy resin, or phenolic resin prevented the adherence of insoluble calcium carbonate and other precipitates to the element when heating a mixture of crude petroleum and mineralized water, wherein the element was continuously exposed to an oil wash. Even though these coating materials proved fully effective in scale prevention at relatively high temperatures where no boiling occurred in heat treating crude petroleum emulsions, I later learned they would not apply to systems boiling mineralized waters. I also found that the reason the above-mentioned coating materials would not prevent scaling at boiling temperatures was because they adsorb water after prolonged contact with it, and become water wettable and susceptible to solids adherence. This is very prevalent when saturation is reached, and soluble salts are precipitated. Most industrial plastics such as epoxy resins, phenolic resins, polyethylene, neoprene, and the silicones are generally regarded as being preferentially oil wettable, but since they all adsorb traces of water upon prolonged contact with it, they eventually become oil repellant when immersed in a water environment, becoming water wettable and subject to solids adherence. Although I am not familiar with all industrial plastics, I have found only the fluorocarbon resins such as DuPont's Teflon to be substantially zero water adsorbent and permanently water repellent when immersed in water indefinitely. I would presume pure gold to also be zero water adsorbent, since it has been found that a thin gold coating will render steam condensing tubes permanently water repellant and subject to dropwise condensation. In view of the foregoing, I have discovered that zero water adsorbent coatings such as the fluorocarbons, particularly DuPont's 'hexafluoropropylenetetrafluoreothylene' with the tradename FEP, retain their preferentially oil wettable properties in indefinite contact with boiling brines, and that their wetting with oil effectively prevents adherence of any precipitated salts to their surface. I also tried similar tests, using an oil wash, with phenolic resin and epoxy resin coated heating tubes and found the salt growth on them to be quite rapid, as much as ½ inch salt thickness on a 1 inch diameter tube in 8 hours boiling of brine. FEP coated heating elements also salted up in boiling brine when no oil was present in the system. The teaching in my patent U.S. Pat. No. 2,903,243 and other patent art to the present time, and in technical literature in general, is not sufficient to enable technicians to boil brines or mineralized waters without scaling, even though the so-called preferentially oil-wettable materials listed in U.S. Pat. No. 2,903,243 are used with oil. If it were so, this means would have been employed years ago to cope with this very serious problem. Only in comparatively recent work, embodied in this and companion applications, have I discovered that the vital key is the use of substantially zero water adsorbent coatings, rather than the general run of temporarily oil wettable coatings. A chief discouraging factor in the use of fluorocarbon coatings on metallic heat exchanger tubes has been the prohibitive cost and difficulties in achieving good, permanent coatings; so difficult that industrial coaters shy away from doing such. Pure, small diameter, comparatively thick walled (10 mils) bundles of teflon tubes are in use for corrosive fluids, but they do not teach the use of oil films with them to prevent fouling. A metallic thin walled tube with a very thin coating of fluorocarbon (range of 0.5 to 2 mil thickness) is best for efficient heat transfer. Because of urgent need for such a tube to effect the method disclosed in this application and companion applications, I have perfected an economical means of heat bonding a coating of DuPont FEP to a metal surface which is strongly bonded and substantially permanently zero water adsorbent, and suitably thin. This method is the substance of my pending application Ser. No. 41,375, now abandoned, and in my U.S. Pat. Nos. 3,837,956 dated Sept. 24, 1974 and 3,841,937 dated Oct. 15, 1974, both based on said application Ser. No. 41,375. I believe the novel disclosures on new and important uses for the basic methods described in U.S. Pat. No. 2,903,243 in this application, together with my discovery that substantially zero water adsorbent materials are essential to boiling of mineralized waters, are distinct and major improvements over the teaching of U.S. Pat. No. 2,903,243. I further believe that they will prove to be vital elements in solving some of the presently unsolved very serious problems in a broad spectrum of industry.

The Objects and Advantages of this Invention are as follows: Provision of method and apparatus to:

1. Exchange heat with maximum continuous efficiency between two fluid systems through a permanently oil wettable wall without deposition of solids on the wall, wherein one of the fluids is, substantially, a mixture of oil and aqueous solution, and the other fluid may be liquid or gas or both, containing oil if solids are present, 2. Efficiently and economically waters containing dissolved and/or suspended solids to any desired extent including total dryness; recovering both the solids and water vapor or only either, if desirable; all, without fouling of the heating and evaporating system with mineral scale or solids.

3. Accomplish (1) and (2) without chemical treatment to prevent fouling of heat transfer surfaces thereby eliminating chemical costs and expensive chemical control.

4. To convey or circulate liquids containing dissolved or suspended solids without deposition of solids on the contacting surfaces thereby avoiding expensive shutdown time for clean-outs.

5. To heat, cool or evaporate extremely corrosive liquids, acidic or alkaline, in (1) and (2).

6. To accomplish (2) in multi-stage or vapor compression distillation if required thereby conserving energy.

7. Provide a novel, permanently oil wettable heat exchanger tube design for heating mixtures of oil and solids-forming aqueous solutions wherein a vertically disposed tube is attached to the exchanger header at one end only, permitting uninhibited thermal expansion when heated; avoiding sedimentation common to horizontally disposed heat exchangers and vertical heat exchangers with conventional headers at each end of the tubes; permitting simple removal of the tube bundle from the top of the heating vessel without drainage of the vessel. Further provide an inner return condensate tube inside the heat exchanger tube with a unique arrangement of sizing that permits complete and continuous removal of liquid condensate from the lower portion of the heat exchanger tube with a negligible loss of vapor assuring maximum heat transfer efficiency with constant condensate removal.

8. Enhance heat transfer by the method of injecting inert gas or steam into the heat transfer zone outside the heating tube, wherein the injected gas increases the flow velocity of the circulating liquid and disrupts stagnant, insulating films on the heater tube, increasing heat transfer rate as much as 80% thereby greatly reducing the size requirements for expensive equipment.

9. Prevent salt buildup in and seizing of pump with water wettable interiors when circulating oil is contaminated with salts and brine, by injection of fresh water into the oil stream to the pump suction in amounts as small as one part of water to 3000 parts of oil; thus avoiding the need for a very expensive step of complete cleansing of the oil prior to pumping, or the alternative expense of providing of permanently oil wettable interiors for the pump.

10. Feed an aqueous solution (brine etc.) to a circulating hot oil as a highly dispersed mixture composed of the solution and oil from a cooler part of the system, this mixture being effected by a mixing pump; with oil being the continuous phase of the mixture in order to facilitate complete mixing with the circulating hot oil when combined with it, which, in turn, provides thorough dispersion of the solution droplets throughout the hot circulating oil without the added cost of having to subject the hot circulating oil to mixing with the aqueous solution in a pump with attendant vapor lack problems; the purpose of the whole procedure being to more efficiently vaporize the solution droplets by intimate contact with the hot oil with minimum pump size.

11. Assure oil wettable surfaces for all interior areas contacting the fluids being evaporated or circulated, using substantially zero water adsorbent materials (such as fluorocarbon resins) on heating surfaces, heater chamber interior, cascading baffles, and interior of flashing chamber; and lesser oil-wettable materials such as neoprene for interiors of a hot oil-aqueous solution mixing chamber, and conduits between the evaporator tank and the heating chamber; also using substantially zero water adsorbent surfaces contacting the solids slurry throughout its flowsheet all aimed at trouble-free operation.

12. Prevent solids crystalline growth on roughened surfaces or sharp edges, even though permanently oil-wettable, by complete elimination of such surfaces or edges from the hot oil-aqueous solution mixing zone to the solids slurry settling zone in the flashing cascading chamber providing for more trouble-free operation than otherwise attainable.

13. Assure a more efficient and less fouling operation with abundent surface exposure of liquid-vaporsolids mixture in the cascading chamber by cascading it downward over tiers of inverted, half cylinders which are preferentially oil wettable, and which contain no sharp edges or rough surface; which, further, permit removal of released vapors through their ends without recontacting them with the falling liquid.

14. Effect a smoother and more efficient operation by automatically and separately removing produced solids slurry and unevaporated aqueous solution as they accumulate.

15. Recycle the unevaporated aqueous solution, if required, admitting sufficient oil with the solution to prevent solids deposition on the preferentially oil wettable interiors of the pump and conduit for its recycling providing fouling-free operation.

16. Convey the unevaporated aqueous solution remainder, if required, to a 2nd stage evaporator, injecting sufficient hot oil from this 2nd stage into the solution as it leaves the 1st stage to prevent solids deposition on all conduit and controls interiors which are preferentially oil wettable.

17. Remove mist of entrained oil suspended solids and aqueous solution from the vapor in a scrubber which contains no rough surfaces or sharp edges, and which is preferentially oil wettable to prevent adherence of solids and to assure trouble-free operation.

18. Effect multi-stage distillation of aqueous solutions with sufficient control to permit separation of salts into various components in certain mineralized systems.

19. Convey heat from a remote, and possibly dilute, source by circulating oil through such a source to absorb heat, returning it to be mixed with aqueous solution for evaporation as herein disclosed; some of such heat sources being for example geothermal wells, sub-surface terrestrial formations, and solar heat absorption devices thereby utilizing clean and inexhaustible sources of natural heat. Should heated oil temperatures be below atmospheric pressure evaporation temperatures, subatmospheric pressures could be employed to effect evaporation using the afore-described methods.

20. Utilize an oil type liquid for the multi-purpose of conveying heat to an aqueous solution to be evaporated, wet the preferentially oil wettable surfaces of the confining system with a film to prevent adherence of solids and act as a vehicle to convey the suspended solids to a suitable settling zone offering the advantage of continuous, trouble-free operation.

21. Separate solids slurry into a saturated solution (for return to the system) and a damp solids product, using oil in the system of separation and handling to prevent adherence of solids to the preferentially oil wettable contacting surfaces thereby minimizing expensive shut-downs for cleaning.

22. Pre-heat the incoming raw aqueous solution, containing dispersed oil, with hot condensate product in a preferentially oil wettable heat exchanger thereby providing, continuous, maximum heat transfer without fouling of the surfaces.

DESCRIPTION OF THE INVENTION

This apparatus and method are a novel approach to the evaporation of both saturated and unsaturated aqueous systems to any desired extent, including dryness. The water in the aqueous system may contain both dissolved and suspended solids, or only one or the other. Evaporation is effected without depositing any solids on any of the interior surfaces except those in the final settling zone from which they are removed as a slurry without caking to the surface supporting them.

The invention will be more readily understood by reference to the accompanying drawings and the following detail description.

IN THE DRAWINGS

FIG. 1 is a diagrammatic view of the heating and evaporating system as a whole and which includes a cascading vessel having various forms of cascading elements therein;

FIG. 2 is a detail view, partly in section and partly in elevation, of one of the cascading elements or members together with a supporting rod or tube suitably mounted within the cascading vessel;

FIG. 3 is a detail view of a preferentially oil wettable hood which provides a roof over an oil quieting zone also mounted within the cascading vessel;

FIG. 4 is a further detail view of a perforated conical distribution hood mounted within the cascading vessel and which covers the cascading elements within such vessel; and FIG. 5 is a detail view of one of the perforated portions of the conical distribution hood of FIG. 4.

Referring more particularly to the heating and evaporating system illustrated in the flow sheet (FIG. 1) this system contains several principal elements namely a heater tank or vessel 1 mixing chamber 2, and a cascading and evaporating tank or vessel 3 and suitable connections including inlet and outlet pipes and controls which will be more fully described hereinafter.

The heater tank or vessel 1 is designed to preheat oil which may be mixed with inert gases, vapors and/or steam, supplied to the mixing chamber of the tank 2.

The preheater tank 1 contains a heat interchanger comprising an outer heater element 5 supported by a header 10. The heating element 5 is of thimble type and is coated inside and out with substantially zero water adsorbent material preferably of fluorinated hydrocarbon resin. Within the outer tube 5 is an inner tube 6 open at both ends and extending into the thimble tube 5 nearly to the bottom thereof and extending upwardly beyond the confines of the element 5. Hot steam or vapor is supplied to the heat exchanger 5 through pipe 7 and inert gas or steam is also supplied to the lower portion of the vessel 1 at 14' from a suitable source. Recirculated oil to be reheated is supplied at 12 under pressure from the cascading vessel 3 to be more fully described hereinafter. The oil supplied under pressure at the bottom of the tank 1 is passed upwardly through the tank or chamber and is heated by the heat exchanger 5, 6. The heated oil passes from the top of the chamber or tank 1 at 13 through pipe 14 to a horizontal mixing chamber 2 and is admixed therein with a highly dispersed aqueous solution in oil which enters the mixing chamber of tank 2 from pipe 45. The pipe 45 receives recirculated oil from the cascading and evaporator tank or chamber 3 and is being previously mixed with an aqueous solution by means of an oil-solution mixing pump 42. Other fluid connections leading to the pipe 45 will be described hereinafter. The fluids, namely heated oil from the tank 1 and a highly dispersed aqueous solution in oil entering the mixing tank or chamber 2 at 15 and 46 respectively, are mixed in such chamber and pass therefrom through outlet 17 and pipe 18 to the upper portion of the evaporator cascading tank or chamber 3. The material entering the evaporator tank 3 comprises a mixture of hot oil, vapor, unevaporated aqueous solution, inert gas and precipitated solids. The portion 19 of the pipe 18 extends through a hood-like conical member 73 into a discharge zone 19' and the hot fluids the mixing tank 2 are discharged from outlet 19 onto a conical distributor hood 20 having perforations 20' therein as shown in FIGS. 1, 4 and 5. From the hood 20 the fluids pass over a series of sets of cascading members 21 supported on rods or tubes 22 (FIGS. 1 and 2) within the cascading chamber or zone 22'. From the zone 22' the fluids pass over a sloping oil wettable hood 23 (FIGS. 1 and 3) which covers an oil quieting zone 33'. Within the cascading tank 3 a separation of oil, water, gases and solids takes place as will be more fully set forth hereinafter.

Vapors and gases are passed from the upper portion of the tank 3 at 24 into an entrained liquid scrubber 4 having a scrubber chamber 26 therein. Clean steam and other inert gas, if used, is removed from the scrubber chamber 26 through pipe 27 and oil suspended solids and aqueous solution from the separator are withdrawn at 28 and returned to the oil zone 31 of the cascading tank 3 through pipe 29 entering the tank at 30.

Below the hood 23 there is disposed within the tank 3 an open-ended upright cylinder 34 into which extends an upturned outlet pipe 36 connected through conduit 37 and 39 with the lower end of the heater tank 1 through inlet 12 as previously described. A pump 38 provides positive pressure for the recirculated fluid passing through pipe 39.

A branch conduit 40 branching off the conduit 39 on the downstream side of pump 38 supplies a minor portion of the return oil from the evaporation tank 3 through a proportioning control valve 41 to a mixing pump 42, where the oil is mixed with re-cycled and make-up aqueous solution supplied through the proportioning control valve 51. The aqueous solution is dispersed into the oil with the oil acting as the outer phase of the dispersion. A valve 47 connected between the outlet and inlet sides of the mixing pump 42 provides a by-pass for the pump to recirculate oil from the pump outlet to pump inlet and insure violent mixing of the oil and water solution. The highly dispersed mixture of aqueous solution in oil from the mixing pump 42 is fed through the control valve 43 (governed by the temperature of the oil in oil zone 31 of tank 3) and conduit 45 into the mixing tank 2 at outlet 46.

The portion of aqueous solution stratified in water zone 59' of evaporator tank 3 that is to be recycled is pumped from zone 59' of the tank 3 through outlet 53 by the pump 54 which is governed by probe 56 at the oil-water interface between oil zone 31 and water zone 59'. A branch conduit connects the inlet side of pump 54 with the oil stratum zone 31 through outlet opening 55 and includes a hand set valve 2'. A portion of oil from oil zone 31 is mixed with aqueous solution from water zone 59' at the inlet side of pump 54 for the purpose of prevention of solids adherence to the preferentially oil wettable surfaces provided in pump 54 and the circuit connected therewith. A conduit 57 connects the outlet side of pump 54 with a make-up aqueous solution conduit 50 at T-joint 58, and feeds recycled aqueous solution to the make-up aqueous solution conduit 48. Make-up aqueous solution is fed from a cold source 48' through a conduit into the heat exchanger 52' where it is heated by hot condensate fed in indirect heat exchange relationship through conduit 50'' from a second stage evaporator, (not shown). A portion of the circulating oil from conduit 39 is fed through a hand set valve 49' and conduit 50' into the cold source feed line on the inlet side of heat exchange 52' where the oil is mixed with the make-up aqueous solution. This mixture of oil and aqueous solution is passed through zero water adsorbent tubes of heat exchanger 52', and out through conduit 48, through check valve 49 and through conduit 50 to join recycle aqueous solution as previously described. The cooled condensate from heat exchanger 52' is passed to storage (not shown) through conduit 51'. All of the contacting interiors of the aforedescribed flow sheet are preferentially oil wettable to prevent adherence of solids.

The general construction and arrangement of the principal elements of the system have been briefly described and further elements and connections will be referred to in connection with an ennumeration of the principal steps of the process which will now be described.

Step (1): Heating the circulating oil

Heating a circulating, non-volatile oil-type liquid, still retaining a portion of solids and aqueous solution carry-over from the evaporation and settling step, with a heating element 5, the surface of which is substantially zero water adsorbent and which is preferentially oil wettable in the presence of both oil and water. This heating element may utilize any source of heat such as vapor condensation, hot circulating fluids, combustion of gases, or electrical resistance. Since this invention includes a novel heat transfer tube arrangement, this is described in the drawing as the heating means for the circulating oil, utilizing heat from the condensation of vapor. This heating element raises the circulating oil temperature without deposition of any entrained solids from the oil on its substantially zero water adsorbent surface which is constantly washed with the circulating oil. The fluorocarbon resins, particularly DuPont's Teflon type material called FEP with the technical name of hexafluoropropylenetetrafluoroethylene, have proved to be the most suitable zero water adsorbent coatings for surfaces requiring this property. Other initially oil wettable materials such as phenolic and epoxy resins as set forth in my U.S. Pat. No. 2,903,243 dated Sept. 8, 1959 were tried as coatings on such heating elements while heating contaminated oil, but became water wettable in a few hours and permitted deposition of approximately ¼ inch of salt on the tube surface in 24 hours heating time. Only substantially zero water adsorbent surfaces such as DuPont FEP showed no trace of salt deposition on heating tubes in operation up to 400 hours. It is assumed this condition should prevail indefinitely as it is well known there would be no chemical or physical change in the FEP fluorocarbon, and, most important, substantially no water adsorption. In this step of heating the circulation oil I have found that the injection of steam or other preferably inert gas such as inert nitrogen greatly enhances the heat transfer through the heating tube wall to the oil. I have found that injecting approximately 1 part (by volume) gas to 4 parts oil increased the heat output of the tube as much as 80%, where the gas was injected with the oil into the lower zone of a heating chamber. Steam is preferable to nitrogen for this use, since it passes out with the steam produced from the evaporation process, whereas nitrogen would require separation from the produced steam and recovering for re-use.

The details of step 1 are as follows: Warm oil, containing variable amounts of solids and aqueous solution carried over from setting zone 33' of tank 3 (see FIG. 1) is conveyed through conduit 39 into the bottom of heater tank 1 at 12. Here it is mingled with inert gas or steam in zone 15' from source 12' through conduit 13' discharged at outlet 14'. This mixture of oil and gas flows upward in intimate contact with a heating element 5 which is coated with substantially zero water adsorbent material to prevent adherence of solids. The mixture of heated oil and gas leaves the top of heater tank 1 at outlet 13 passing through conduit 14 to a hot oil-aqueous solution mixing tank 2 at inlet 15. The particular novel heating tube depicted herein (FIG. 1) functions as follows: It utilizes heat liberated by condensation of a vapor, usually steam, though not restricted solely to steam. It consists of an outer thimble-type tube 5, attached at one end to a header or tube sheet 10 with a heating vapor inlet 7. This thimble tube may be made of any metal suitable for the liquid to be heated, but in all cases must be coated with a substantially zero water adsorbent material, preferably a fluoronated hydrocarbon resin such as DuPont FEP. Inside this tube 5 is a smaller tube 6, open at both ends, which is inserted relatively near the bottom of the thimble tube 5. This tube may be of the same material as the outer tube 5, or any other material, metal or otherwise, that is unaffected by the temperature and chemical nature of the condensing vapor. Its function is to remove all of the condensate as it is formed, with a minimum loss of vapor, automatically maintaining a liquid seal of condensate. Its diameter is such as to permit passage of the maximum amount of condensate produceable under the operation conditions of the system. When the condensate level reaches inlet 8 of tube 6 and vapor attempts entry into the tube, resistance to flow of vapor immediately becomes sufficient to obstruct it, reestablishing the condensate liquid seal which prevents leak-by of appreciable amounts of vapor. Any slight loss of vapor due to a very minimum leak-by is justified by the non-mechanical simplicity of this liquid seal method which I believe to be novel and unique, and one which permits a design embodying a vertically disposed heating tube with one end unattached and free to expand and contract without becoming fouled with sediment. The condensed vapor leaves tube 6 at 9 to enter a condensate header (not shown) when multiple tubes are employed. Tube 6 is attached to tube sheet 9' which attaches to the outer tube 5 as shown, depicting a single tube arrangement. The annular space between tube 6 and the inner wall of tube 5 is filled with vapor completely to the condensate inlet 8 of tube 6, the vapor condensing in contact with tube 5. The inner surface of heater tube 5 may be coated with a fluorocarbon resin to promote dropwise condensation of the vapor, when it is steam, causing the condensate to trickle down the wall in streamlets, leaving more exposed surface to promote more efficient heat transfer through tube 5. This tube 5 is shown in a single arrangement, but may be composed of many such tubes as a bundle, being readily removeable from the top of heating chamber through flanged outlet 11. An auxiliary drain valve 16' is depicted at the bottom of tank 1, for manually bleeding off accumulated sludge, or simply draining the tank for any required purpose.

Step (2): Reacting the heated oil with aqueous solution (FIG. 1)

After being heated, the circulating oil from tank 1 enters mixing tank 2 at 15 and is then intimately mixed with aqueous solution (shown as a dispersion in oil in this disclosure), converting all or a portion of it to vapor. Since the total source of heat to vaporize the water must come from the heat of liquid of the oil, there must be a preponderance of oil to water. The initial temperature of the oil must be enough greater than the boiling temperature of the aqueous solution to provide a temperature drive through the oil and water interfacial films sufficient to effect boiling of the droplets of aqueous solution. The smaller the drops of aqueous solution and the more intimately they are mixed with the body of oil, the more readily and rapidly will they be converted to vapor. This is why it is preferable to premix the aqueous solution feed with a portion of the warm circulating oil, as shown in a mixing pump to promote a finely dispersed aqueous solution in the oil which functions as an outer phase and is very readily mixed, later, with the hot circulating oil in mixing tank or chamber 2. The mixing of the aqueous solution or dispersion in oil with the hot oil in tank 2 may be effected in many conventional ways such as restriction of flow and subsequent expansion, baffling or tortuous flow, and is not described herein. I have found it very advantageous, however, to provide smooth contacting surfaces with no sharp edges, such surfaces being preferentially oil wettable, to prevent adherence of precipitated solids to the surfaces. Also, all passageways for the mixture, whether horizontal or vertical, prior to entry into the evaporator-cascading vessel 3, should be sufficiently restricted so that the velocity of the mixture will prevent any dropout of solids. Larger passageways and baffling as in tanks 2 and 3 should have substantially zero water adsorbent surfaces such as DuPont FEP, whereas smaller conduits such as 18 and 19 may be neoprene lined and still avoid deposition of precipitated solids. To illustrate the importance of oil wettable surfaces in this process: I have found that mixing hot oil with aqueous solution in a restricted, neoprene hose to produce steam and solids as the mixture flowed to a flash tank produced no deposition of salt on the hose interior, but that salt formed on the discharge end of the hose where the fabric insert in the hose was exposed to the discharging mixture. Trimming the end to a bevel eliminated the salt deposition on the water wettable fabric once it was removed. In this 2nd step, the mixing of the hot oil and aqueous solution should be complete, although the extent of conversion of the solution to steam is quite variable, depending upon the time of exposure, the temperature of the oil, the ratio of oil to solution, and the pressure in the mixing system. I have found it preferable to evaporate only a portion of the aqueous solution in this mixing step, finishing the evaporation to the required extent in the combination flashing and cascading chamber 3 to be more fully described in forthcoming step 3. The final extent of aqueous solution evaporation in the whole system is governed by the amount of solution feed to a constant oil circulation rate with a constant temperature of the hot oil feed to the mixing tank, all in a fixed volume system. Some processes may require complete evaporation of the aqueous solution, whereas others may require a partial evaporation to promote removal of separate components of salts in succeeding stages of evaporation. This method and apparatus lends itself to either. The mixture of oil, vapor, solids, and unevaporated aqueous solution leaves mixing tank 2 at 17, passes through conduit 18, then from discharge outlet 19 into evaporator tank 3, to step 3.

Step 3: Flashing of vapor, vapor removal and further evaporation by cascading, settling: (FIGS. 1, 2, 3, 4 & 5)

The mixture of hot oil, (cooled somewhat by the vaporization in step 2) vapor, precipitated solids, and unevaporated aqueous solution is discharged into vessel 3 where all interior parts and surfaces are coated with substantially zero water adsorbent material, vessel 3 functioning as follows:

a. Flashing vapor from the liquid mixture at outlet pipe 19, vaporizing a portion of the remaining aqueous solution by discharge into zone 19' at a lower pressure. This vapor is removed from zone 19', with partial scrubbing of any fine, entrained liquid droplets with a hood-like cone 73 which is coated on both sides with a substantially zero water adsorbent material. This vapor then joins other removed vapor at 24 to leave vessel 3 through conduit 25 to final scrubber 4 at zone 26. The clean vapor (and inert gas if other than steam was used for injection into vessel 1 leaves scrubber 4 to be condensed or used for heating in the next evaporation stage. The removed oil suspended solids and aqueous solution leaves tank 4 at outlet 28 to return to oil zone 31 of tank 3 through conduit 29 at inlet 30. This scrubber 4 can be one of many designs, but it should have all interior surfaces coated with substantially zero water adsorbent material, with no sharp edges, rough surfaces or pockets for solids accumulation.

b. Removing the remainder of the vapor from the foaming oil-aqueous solution-solids mixture by passing it through the perforated conical distribution hood 20 FIGS. 1 & 4 which is substantially zero water adsorbent on both sides, downward over substantially zero water adsorbent downward sloping surfaces of members 21 and 22 (FIGS. 1 & 2) which have no sharp edges, no rough surfaces and no pockets to catch solids.

c. Evaporating a further portion of the aqueous solution entrained in the still hot oil as the mixture is subjected to additional exposure as thin moving layers on cascading surfaces of members 21 and 22 and falls in sheets and streamlets from one tier of cascading members to the next.

d. In the design depicted showing cascading members 21 which are inverted half cylinders supported by smaller rods or tubes 22 with all surfaces substantially zero water adsorbent, water vapors pass up under the inside surface of the hollow, inverted half cylinders 21 and out at each end, thereby avoiding remixing with the cascading liquid mixture. The preferentially oil wettable undersurface of the half cylinder scrubs out contacting oily mist and lesser water content, rejoining it with the downward moving body of liquid that spills over the sides of the inverted half cylinders.

e. The oil, precipitated solids and any remaining aqueous solution mixture leaves the cascading zone 22' with substantially all entrained vapor removed, and with sufficient reduction in temperature that no further evaporation of aqueous solution is possible. It flows over a sloping, preferentially oil wettable hood 23 (FIGS. 1 & 3) which provides a roof over oil quieting zone 33' and which directs the mixture to the outer periphery of vessel 3 to settling zone 31. Zone 31, just below foam zone 32 is an aqueous solution and solids drop out zone for the oil from whence the oil moves at 33 to quieting zone 33' created by open ended vertical cylinder 34. The remainder aqueous solution drops out of oil settling zone 31 to zone 59', the solids slurry dropping on downward to inverted conical solids slurry zone 63 at the bottom of tank 3.

Step (4): Disposition of oil and unevaporated aqueous solution from vessel 3:

a. Oil, with most of the aqueous solution and solids removed from it, in oil quieting zone 33' is removed from vessel 3 through overflow outlet pipe 36 and through conduit 37 to a pump 38 which recirculates it through conduit 39 to heating vessel 1 at zone 15'. All of the contacting surfaces for the returning oil from tank 3 to tank 1 should be preferentially oil wettable, though not necessarily zero water adsorbent. Not having a circulating pump 38 available with oil wettable interiors, I used a small gear pump with bronze trim in my preliminary tests. In 48 hours, salt depositions caused seizure of the rotors. I found that injecting fresh water just ahead of the pump suction in a ratio as small as 1 part water to 3200 parts of oil completely eliminated seizure in the pump. The alternative to my novel preferentially oil wettable surfaces for this return oil circuit would be the provision of 100% clean oil, a procedure which would be both difficult and expensive.

b. A very minor portion of the return oil from the cascading vessel 3 through pump 38 is sent through proportioning control valve 41 from outlet 40 of conduit 39. This oil is mixed in mixing pump 42 with recycled and make-up aqueous solution which come through proportioning valve 51, and are dispersed into the oil with the oil acting as the outer phase of the dispersion. Valve 47 acts as a by-pass for the mixing pump 42 to discharge and pump back into its own suction to assure violent mixing in the pump. The feed of oily dispersion is fed from mixing pump 42 through control valve 43, governed by the temperature of the oil in oil zone 31 of tank 3, through conduit 45 to mixing tank 2 at outlet 46. The portion of dropped out aqueous solution in water zone 59 of tank 3 that is to be recycled leaves zone 59' at outlet 53 to pump 54 which is governed by probe 56 at oil-water interface between oil zone 31 and water zone 59. A portion of oil from oil zone 31 leaves at 55 through a hand set valve 2' to join aqueous solution moving to pump 54, for the purpose of preventing solids adherence to all preferentially oil wettable surfaces in this circuit. This mixture of oil and recycled aqueous solution passes through conduit 57 to join pre-heated oily, make-up aqueous solution at 58 and proceeds to proportioning control valve 51 as previously described. The make-up aqueous solution from cold raw solution feed source 48' is mixed with a portion of the circulating oil which is supplied from conduit 39 through hand set valve 49' through conduit 50'. This oily mixture of cold aqueous solution passes through substantially zero water adsorbent tubes of heat exchanger 52', being heated by hot condensate from source 50' from the 2nd stage evaporator, and out through conduit 48 through check valve 49 through conduit 50 to join recycled aqueous solution as previously described. The cooled condensate from heat exchanger 52' passes to storage from 51'. All of the contacting interiors of the aforedescribed flowsheet are preferentially oil wettable to prevent adherence of solids.

c. If the process involves more than one stage of evaporation, and none of the unevaporated portion of aqueous solution is to be recycled, then such aqueous solution would be removed from water zone 59' of vessel 3 at outlet 66 through valve 67 controlled by probe 68 at the oil-water interface between zones 31 and 59', being mixed with oil at junction 72, this oil coming from the 2nd stage at 70 and fed by pump 71 which is hand regulated, the purpose of this oil being to prevent adherence of solids to preferentially oil wettable surfaces in passing from 66 to 2nd stage. The oily aqueous solution leaves control valve 67 to pass through conduit 69 to become make-up feed for the 2nd stage of its evaporation.

When recycling aqueous solution the probe 56 senses the interface between the oil in water zone 31 and the aqueous solution in water zone 59' and controls the pump 54 to increase or decrease the volume of solution pumped from water zone 59' in order to maintain the oil-aqueous solution interface level substantially constant.

When passing the aqueous solution to a second stage evaporator the probe 68 senses the interface between the oil in zone 31 and the aqueous solution in zone 59 and controls the valve 67 to regulate the outflow of aqueous solution from the zone 59' in order to maintain the oil-aqueous solution interface level substantially constant.

Probe 65 responds to a difference in density between the aqueous solution and the solids slurry in zone 63 to regulate the control valve 64 permitting the removal of solids slurry from the bottom of evaporator tank 3 as it accumulates in zone 63.

Probe 44 extending through the side wall of tank 3 into oil zone 31 is a temperature responsive probe which regulates the flow of oil-aqueous solution dispersion through valve 43 in order to decrease the flow of the dispersion as the temperature in oil zone 31 drops and increases the flow of the dispersion as the temperature in zone 31 rises.

Probes 44, 56, 65 and 68 are all commercially available probes which can be more fully described if necessary, but are not part of the present invention.

Step (5): Disposition of solids slurry from zone 63 of vessel 3

The solids slurry is removed from the bottom of the cone of evaporator vessel 3 from solids-slurry zone 63 through control valve 64 which is governed by probe 65 which in turn is governed by the density of the slurry. If sufficient oil is not occluded in the settling slurry in zone 63, supplemental oil may be supplied from the 2nd stage evaporator through hand controlled valve 68 through conduit 69' to slurry zone 63, this oil being supplied by a pump (not shown). This oil is required to prevent adherence of solids to the totally preferentially oil wettable surfaces contacting the slurry from its departure from zone 63 to the final destination of the separated products. The slurry passes from solids-slurry zone 63 through control valve 64 through pump 65' to a solids-liquid separator, in this disclosure depicted as a liquid cyclone 64'. In this separator it is separated into a damp solids product which goes to storage or further drying at 66' and an aqueous solution-oil mixture which leaves the separator at 67' to pass to the 2nd stage, or back to aqueous solution zone of tank 3 (not shown) if the system is a single stage evaporator.

FIG. 2 depicts a cross-sectional detail of half-cylinder cascading member 21 and support rod or pipe 22. Both 21 and 22 are externally coated with substantially zero water adsorbent material, usually a fluorocarbon resin, to prevent adherence of solids to their surfaces. The support rod 22 size is governed by the load it must bear and the diameter of the vessel 3, all calculable by those skilled in the art. All surfaces of 21 must be smooth, with no sharp edges for solids deposition and growth, and made of any material suitable for the aqueous solution being evaporated and capable of withstanding bonding temperatures of the oil wettable coating, such as metal or plastic.

FIG. 3 is a cross-section of conical hood 23 of similar material as 21, with smooth surfaces, no sharp edges and preferentially oil wettable.

FIGS. 4 and 5 are details of a perforated distributor cone 20 for uniformly introducing the liquid mixture through pipe 19 to the top of the cascading tiers composed of half cylinders 21. Its size and perforation size are governed by the volume of liquid to be handled and the cross-sectional size of the cascading pile. It is coated similarly to 21 and 23, with no sharp edges or rough surfaces. The perforations 20' are shown in detail in FIG. 5, and project as teats downwardly to assure the liquid will leave the holes as streamlets, rather than adhere to the oil-wettable underside of the cone, flowing down its surface. The teatlike perforations are smooth, with no sharp edges.

In the present specification and claims reference is made to an "immiscible liquid" or "oil," which is temporarily intimately mixed or dispersed, as by agitation, pressure or the like with an aqueous solution to be heated to remove impurities therefrom. Such immiscible liquid or oil while preferably a hydrocarbon need not necessarily be a true hydrocarbon but may be any liquid preferably organic which is immiscible with the aqueous liquid containing impurities to be removed. The particular immiscible liquid or oil to be employed depends on the aqueous liquid to be treated though there may be wide variations dependent on the availability of the liquid and the particular conditions under which the process is to be carried out. For example in treating brine I have found mineral oils such as automobile lubricating oils, turbine oils and the like to be particularly satisfactory and these have actually been used in the process herein described. The turbine oils have been found to be stable and not readily oxidizable on heating. For refining vegetable materials such as beet sugar solutions or the like a non-toxic mineral or vegetable oil may be used. Where a high degree of heat stability is required a heat resistant oil such as silicone fluids or silanes may be employed and are contemplated as intended to be included under the terms "immiscible liquid" and "oil" as used in the present specification and claims.

The "oil" or "immiscible liquid" should be of different specific gravity and of higher boiling point than the aqueous solution with which it is to be temporarily mixed. Mineral oils, vegetable oils, silicone fluids and silanes are well known products are are defined for example in Reinhold's The Condensed Chemical Dictionary, Sixth Edition It will be understood that by the term "immiscible" as used in the present specification and claims a permanent mixture is referred to since the immiscible liquid or oil on the one hand and the aqueous solution on the other hand cannot be permanently mixed but one may be temporarily mixed or dispersed in the other as by the aid of pressure, agitation or the like and such temporary mixture or dispersion may thereafter be separated by suitable means as is well known in the art.

What is claimed is:

1. A vertically suspended heating element for heating fluids, consisting of an outer tube, sealed at the lower end and connected to a source of vaporous heating medium at the top; with an inner tube for removal of cooled or condensed fluid, open at the bottom, and extending to a point adjacent the bottom of the outer tube, and connected to a discharge outlet at the top, having no communication with the outer tube at the top, said heating element having an exterior surface for contacting liquids and contacted portions being composed of a fluorocarbon resin such that said contacted portions of said surface are preferentially oil wettable and substantially zero water adsorbent.

2. The heating element defined in claim 1 wherein the inner condensate removal tube is sized to automatically remove variable amounts of condensate as rapidly as it is formed, retaining a liquid seal of condensate at the tube inlet sufficient to keep vapor escape to a tolerable minimum; providing sufficient passage of condensate through the inner tube to prevent condensate accumulation in the annular space between the inner and outer tubes; functioning thusly with variable rates of condensation, but in the normal operating rate range of the heating system being served.

3. The heating element as defined in claim 1 wherein the inner surface of the outer tube is also preferentially oil wettable with substantially zero water adsorbent material, thereby promoting dropwise condensation of the water vapor.

4. Liquid heating apparatus comprising a heater tank, casing, or vessel having a header and heat exchange means supported by said header, said heat exchange means including a vertically suspended heating element for heating liquid as defined in claim 1, and means for passing liquid through said heater, tank casing, or vessel in heat interchange relation to said suspended heating element.

5. Apparatus for effecting heat transfer of fluids, at least one of which fluids contains dispersed and/or dissolved solids, said apparatus having one or more liquid contacted surfaces which surfaces are (1) preferentially oil wettable and (2) substantially zero water adsorbent, and means for continuously supplying to said contacted surface or surfaces an organic liquid which is immiscible with the fluid contacting said surface(s), to prevent adherence of solids thereto, wherein the fluid contacted surface or surfaces comprise FEP.

6. Apparatus as set forth in claim 5 wherein the contacting surface or surfaces comprise FEP.

7. Apparatus for effecting heat interchange of fluids passing therethrough, said fluids comprising a vaporous heating medium and liquid to be heated, said apparatus comprising an outer tube and an inner tube extending into said outer tube, said apparatus having one or more fluid contacted surfaces which are (1) preferentially oil wettable and (2) substantially zero water adsorbent, and means for continuously supplying to said surface or surfaces an organic liquid which is immiscible with fluid contacting said surface or surfaces to prevent adherence of precipitated solids thereto, wherein the contacted surface or surfaces comprise FEP.

* * * * *